(12) United States Patent
Goodrum et al.

(10) Patent No.: US 8,726,045 B2
(45) Date of Patent: May 13, 2014

(54) AUTOMATED POWER TOPOLOGY DISCOVERY BY DETECTING COMMUNICATION OVER POWER LINE AND ASSOCIATING PDU PORT IDENTIFIER TO COMPUTING DEVICE

(75) Inventors: Alan L. Goodrum, Tomball, TX (US); Roger E. Tipley, Houston, TX (US); Thomas Turicchi, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 585 days.

(21) Appl. No.: 12/935,125

(22) PCT Filed: Mar. 31, 2008

(86) PCT No.: PCT/US2008/004237
§ 371 (c)(1), (2), (4) Date: Sep. 28, 2010

(87) PCT Pub. No.: WO2009/123586
PCT Pub. Date: Oct. 8, 2009

(65) Prior Publication Data
US 2011/0022245 A1 Jan. 27, 2011

(51) Int. Cl.
*G06F 1/28* (2006.01)
(52) U.S. Cl.
USPC .......................... 713/300; 700/297
(58) Field of Classification Search
None
See application file for complete search history.

(56) References Cited

U.S. PATENT DOCUMENTS

| 7,030,734 | B2 * | 4/2006 | Butler et al. ................. 340/3.43 |
| 7,203,849 | B2 | 4/2007 | Dove |
| 2003/0146765 | A1 | 8/2003 | Darshan et al. |
| 2003/0196136 | A1 | 10/2003 | Haynes et al. |
| 2005/0136989 | A1 | 6/2005 | Dove |
| 2006/0085346 | A1 | 4/2006 | Riley |
| 2006/0133368 | A1 | 6/2006 | Tolliver |
| 2006/0282685 | A1 | 12/2006 | Bahali et al. |
| 2006/0282688 | A1 | 12/2006 | Bahali et al. |
| 2007/0070917 | A1 | 3/2007 | Mallya et al. |
| 2009/0089594 | A1 * | 4/2009 | Cagno et al. .................. 713/300 |
| 2009/0189774 | A1 * | 7/2009 | Brundridge et al. .......... 340/654 |
| 2009/0307515 | A1 * | 12/2009 | Bandholz et al. ............. 713/340 |
| 2010/0198535 | A1 * | 8/2010 | Brown et al. .................... 702/62 |
| 2011/0116387 | A1 * | 5/2011 | Beeco et al. .................. 370/242 |

FOREIGN PATENT DOCUMENTS

| CN | 1794636 | 6/2006 |
| CN | 1917433 | 2/2007 |

OTHER PUBLICATIONS

EP Search Report, 08742453.7, Jun. 7, 2013, 8 pps.

\* cited by examiner

*Primary Examiner* — Kenneth Kim (57) ABSTRACT

Systems, methods, and other embodiments associated with automatically detecting and characterizing a power topology are described. One example system includes a topology logic that identifies connections between PDUs and computers that receive power from the PDUs. The example system may include a data store that receives PDU/computer association data from the topology logic. A computer may communicate with a power providing PDU over a power line connecting the two devices. The computer and the power providing PDU may be configured with network interface devices (e.g., Ethernet switches) configured to communicate over the power line using, for example, EoP. The topology logic may discover a PDU/CE association by examining data transmitted over a network to which the computer and/or the PDU are connected.

24 Claims, 7 Drawing Sheets

AUTOMATED POWER TOPOLOGY DISCOVERY BY DETECTING COMMUNICATION OVER POWER LINE AND ASSOCIATING PDU PORT IDENTIFIER TO COMPUTING DEVICE

CROSS-REFERENCE TO RELATED APPLICATION

This application is a national stage application under 35 U.S.C. § 371 of PCT/U52008/004237, filed 31 Mar. 2008.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Power distribution units and computers may be arranged in a topology. A power distribution unit (PDU) may provide power to a computer. To the extent that power delivery topologies have been described at all, they have typically been statically described using data input manually and serially. This type of power topology description has been tedious, error-prone, and subject to becoming out-of-date. These shortcomings are particularly poignant when topology descriptions are referenced by power capping algorithms.

A data center may have numerous pieces of computer equipment. Any single piece of computer equipment (CE) may be used at less than its full potential, and thus at less than its fully rated power requirement. Although any piece of equipment may be used at its full potential at any moment, the average utilization of the set of computing equipment may be relatively low. Because underutilized equipment consumes less than its maximum rated power; a data center may be engineered with infrastructure that supplies less than the maximum power that would be consumed if all the equipment was busy at the same time. As used herein, CE refers to a "computer" and/or to "computer equipment". In one example, a CE may be a piece of information technology equipment that is a consumer of power connected to a power grid that includes at least one PDU. A CE may be, for example, a server device, a data storage device, a networking device, and so on.

Power capping algorithms facilitate engineering decisions concerning power delivery. Choosing the right size of the power-delivery infrastructure includes balancing the cost of the infrastructure against the risk that power demanded would exceed power available. This may occur if, for example, too large a subset of the set of computing equipment in the data center became active at the same time. Power capping systems and methods provide tools for right-sizing power delivery infrastructure. Some power capping systems and methods may dynamically respond to changing conditions. However, to respond effectively, accurate and up-to-date topology maps may be required. For example, a power capping algorithm may require precise and correct information about which pieces of computing equipment (e.g., servers) share a common, limiting, power-delivery component. For example, an algorithm may need to understand which servers are connected to a common circuit breaker. Similarly, the algorithm may need to understand which first-level circuit breakers are combined at a common second-level breaker, and so on.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example systems and methods facilitate automatically detecting and characterizing a power topology that includes a set of power distribution units (PDUs) and a set of computing systems. One example system includes a topology logic that identifies connections between a set of related PDUs and computers that receive power from the related PDUs. The PDUs and the computers may be arranged in a data center that shares a single power entry point and yet which provides power to a number of computers. The data center may be managed by a power capping system that utilizes a map of the connections between PDUs and computers, and/or between PDUs and other PDUs. One example system may include a data store that receives PDU/computer association data from the topology logic. The data store may also receive PDU/PDU association data from the topology logic.

In the arrangement of PDUs and computers in, for example, a data center, a computer may communicate with a power providing PDU over a power line connecting the two devices. The computer and the PDU may communicate using, for example, an Ethernet over Power (EoP) protocol. The computer and the power providing PDU may be configured with network interface devices (e.g., Ethernet switches) that can communicate over the power line. The topology logic may discover a PDU/CE association. In one example, the association may be discovered by examining data transmitted over a network to which the computer and/or the PDU are connected. In one example, the association may be discovered by examining a device discovery report. The device discovery report may be provided over a standard network. In one example, a power line may connect two communicating devices. The devices may communicate using, for example, EoP. In this case, the devices may communicate, for example, server management traffic.

In one example, computer equipment and power-delivery infrastructure may be instrumented so that a topology can be automatically discovered and characterized. In one example, an additional circuit (e.g., NIC) may be added to a server power supply and a similar additional circuit may be added to a power distribution unit. A logic may then determine which server is associated with (e.g., plugged into) which PDU port and may record data describing the connection. One skilled in the art will recognize that a NIC is computer hardware that facilitates computer communications over a computer network. A NIC typically functions at both the physical layer and the data link layer. A NIC typically provides physical access to a networking medium and typically provides a low-level addressing system using, for example, media access control (MAC) addresses.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation.

Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
NIC: Network Interface Controller
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

XML refers to extensible markup language. XML is a document format, a meta-markup language for text documents: XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their, work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 1:
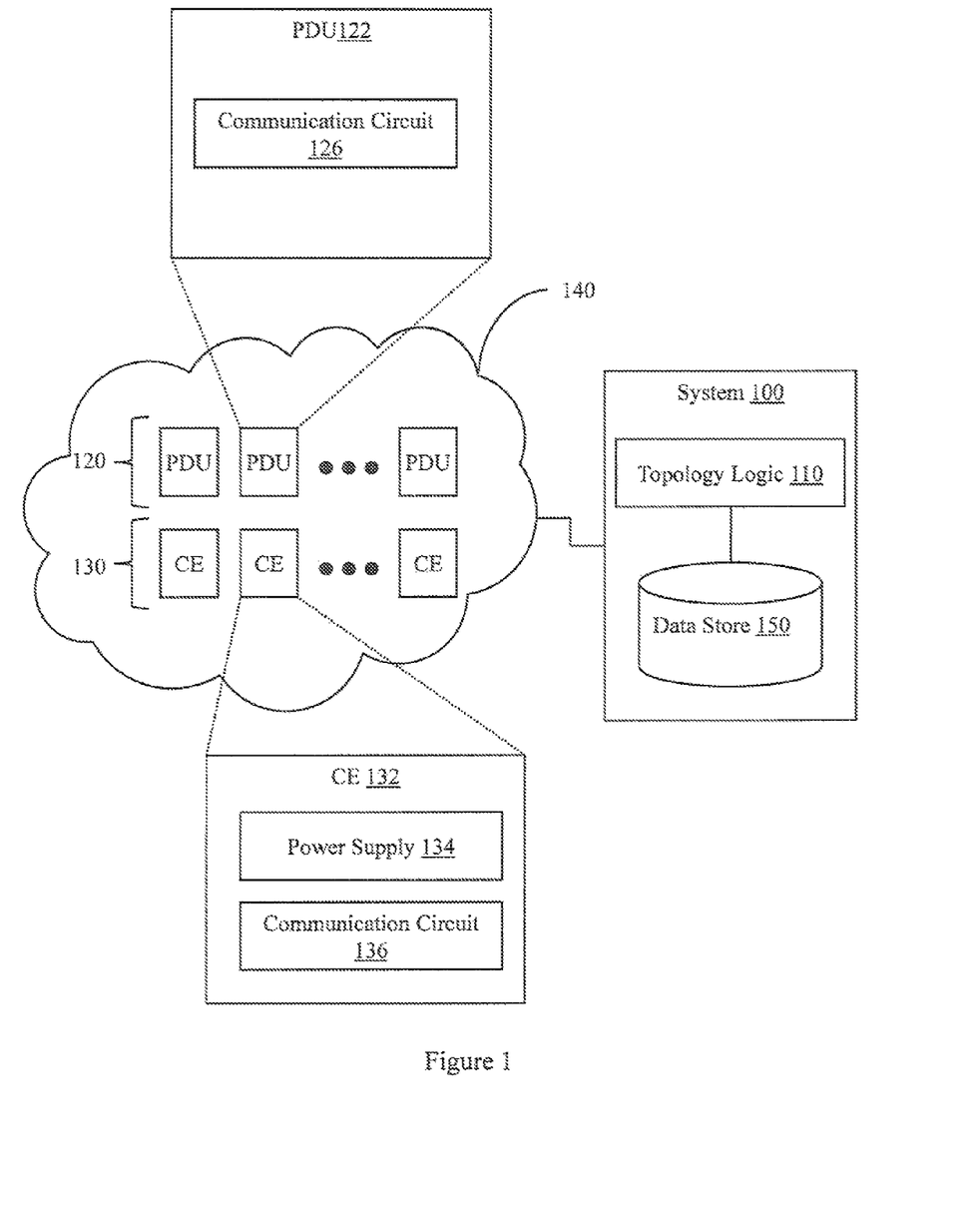
FIG. 1 illustrates an example system associated with automated power topology discovery.

FIG. 1 illustrates a system 100 that automatically discovers and characterizes a power topology. Discovering a power topology may include, for example, identifying PDUs and CEs located in the topology. Discovering the power topology may also include identifying associations between elements of the topology. "Characterizing" the topology may include, for example, describing the power topology by storing a set of PDU/CE associations. The system 100 includes a topology logic 110 to automatically identify a power topology 140 in which a set 120 of power distribution units and a set 130 of computers are arranged. In one example the PDUs and computers may be arranged in a data center. The power topology 140 may be initially identified, and then, over time, as changes occur, the topology logic 110 may automatically re-identify and re-characterize the power topology 140.

A member of the set 120 of PDUs may provide power to a member of the set 130 of computers. Thus, a PDU may be connected to a CE by a power line that delivers power from the PDU to the CE. The power line may also be used for computer communications. In one example, the PDU may include a network interface circuit (e.g., Ethernet switch). Similarly, a CE may include a network interface circuit (e.g., NIC). While an Ethernet switch and a NIC are described, it is to be appreciated that more generally the devices may include communication circuits. In this example, the PDU and the CE may communicate over a connecting power line using an Ethernet over Power (EoP) protocol. An Ethernet frame may include information concerning a source and/or a destination and thus information useful for identifying a PDU/CE association may be available in network traffic broadcast over the power line.

A CE (e.g., CE 132) includes a power supply 134 and a CE communication circuit 136. Recall that a computer receives power from a PDU via a power line. The power line may provide power to the power supply 134. The communication circuit 136 may communicate over the power line with a PDU communication circuit associated with a PDU from which the CE receives power. This communication may include information from which an association between a PDU and a CE can be discovered. Since the CE 132 is connected to a PDU using a power line, and since the power line provides power to the power supply 134, the CE communication circuit 136 is to communicate with the PDU communication circuit through the power line through which the CE 132 receives power.

A PDU (e.g., PDU 122) includes a communication circuit 126 to communicate with the CE. The PDU may also include a network interface device to communicate with a topology network that connects PDUs. Topology logic 110 may also have access to this topology network. The communication circuit 126 may communicate with a CE communication circuit associated with a CE to which the PDU provides power. Thus, a path may exist between PDU communication circuits communicating on one side with a CE and PDU network interface devices communicating on another side with a topology network to which topology logic 110 has access.

The power topology 140 may be described by a set of PDU to computer (CE) associations. A PDU may include a number of ports to which a CE or a PDU may be connected. Thus, a PDU/CE association may include an identification of a PDU port to which a CE is connected. Establishing a complete set of associations between PDUs that are providing power and CEs that are receiving power facilitates describing topology 140. In one example, the complete set of associations may be stored as a list, as a set of records in a database table, as a graph, as a set of attribute/value pairs in an XML file, and so on. One skilled in the art will appreciate that the associations may be stored in various ways. The associations may be stored, for example, in a data store 150. Data store 150 is to receive data from the topology logic 110 concerning the power topology 140. In one example, the data received from the topology logic 110 may describe the set of PDU/CE associations.

In one example, topology logic 110 may discover a PDU/CE association by examining data transmitted over a topology network. The topology network may be a data communication network to which members of the set 120 of PDUs and/or members of the set 130 of CEs have access. In one example, the topology network infrastructure may include the power line connections between PDUs and CEs that also carry data. Topology logic 110 may also have access to the topology network. The data on the topology network may have been transmitted by a CE communication circuit and/or by a PDU network interface device.

Figure 3:
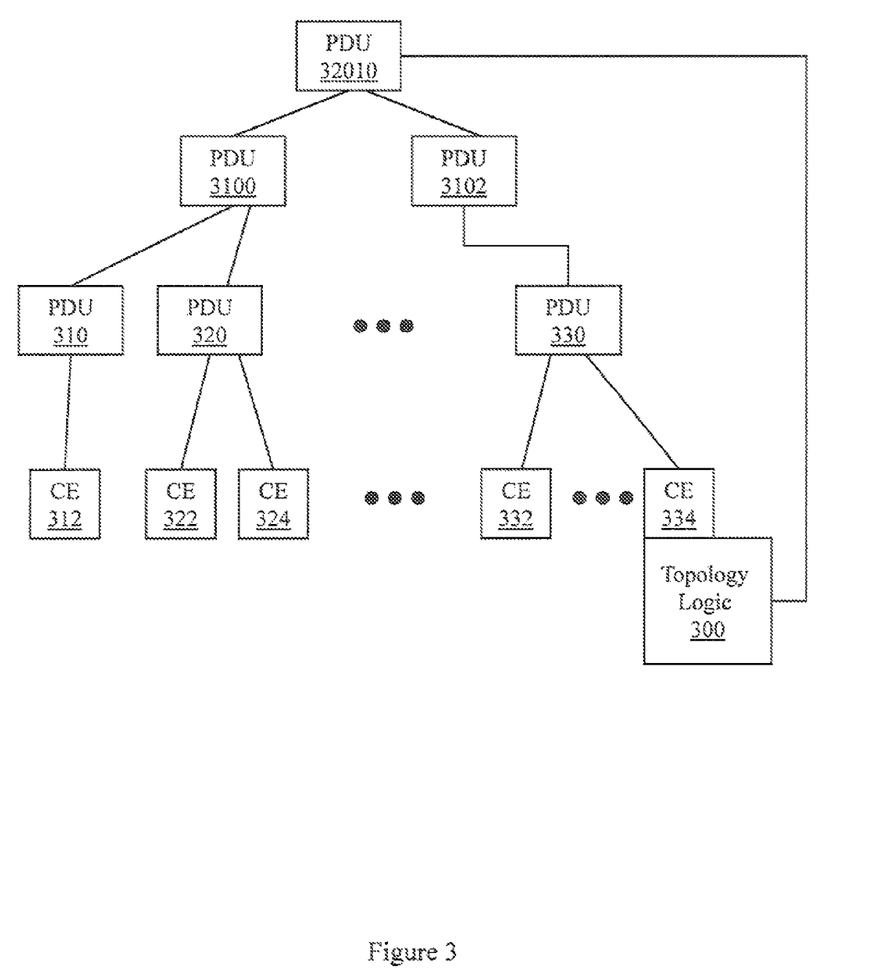
FIG. 3 illustrates another example set of PDUs and CEs arranged in a power topology and a topology logic for automatically discovering the power topology.

In one example, the power topology 140 may include more than one tier of PDUs (see, for example, FIG. 3). Two or more tiers of PDUs may be arranged in a hierarchy whose root may be referred to as a data center power entry point. When a power topology includes two or more tiers of PDUs, the power topology may be described by a set of PDU/CE associations and a set of PDU/PDU associations. Thus, topology logic 110 may discover both PDU/CE associations and PDU/PDU associations. A PDU/PDU association may include an identification of a PDU port to which a PDU is connected.

In one example, topology logic 110 may receive information about communications between PDUs and CEs. Thus, a PDU network interface device may report the existence of a PDU/CE association to the topology logic 110 over the topology network. Reporting the existence of a PDU/CE association may include providing a PDU/CE association that identifies a PDU port to which the CE associated with the PDU/CE is connected. When the topology network is a broadcast type network (see, e.g., FIG. 2), then data transmitted over the topology network may be visible to all elements in the broadcast group. In this example, topology logic 110 may discover associations by examining data transmitted between communicating devices. When the topology network does not broadcast data to all elements (see, e.g., FIG. 3), then the topology logic 110 may receive association notifications from devices configured to detect associations and to report the associations. Once again the associations may be determined by examining data transmitted between communicating devices. For example, a PDU may determine that it has received data from a CE through a certain port. The PDU may recognize this as a new and/or changed connection and thus may report the association to the topology logic 110. In one example the report may be made directly to the topology logic 110 while in another example the report may be made indirectly through one or more intermediate devices.

In one example, a PDU network interface device may be a device that allows management software to relocate the identity of servers connected to a PDU without requiring reconfiguration of network partitions (e.g., virtual LAN (ULAN)). One example device is an HP Virtual Connect Module.

Figure 2:
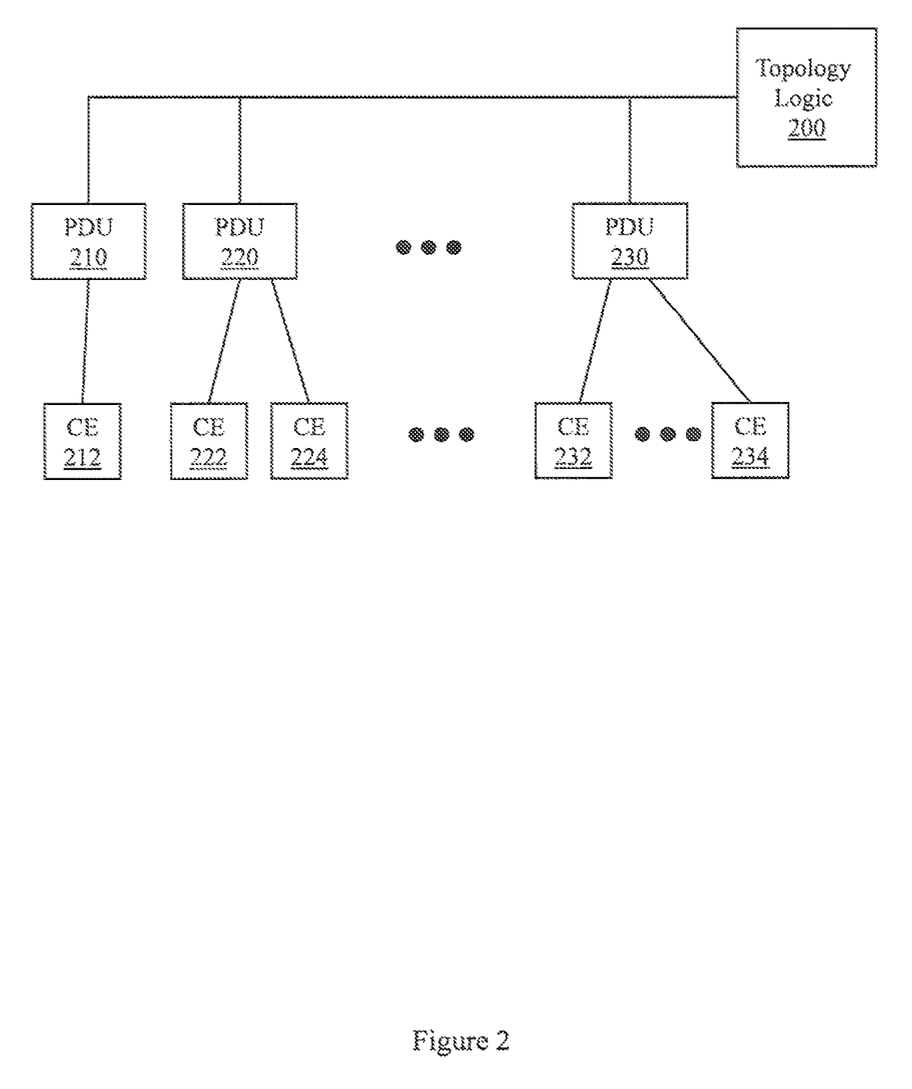
FIG. 2 illustrates an example set of PDUs and CEs arranged in a power topology and a topology logic for automatically discovering the power topology.

FIG. 2 illustrates an example set of PDUs and CEs arranged in a power topology and a topology logic 200 for automatically discovering and describing the power topology. In FIG. 2, the topology logic 200 is illustrated as a separate logic that does not reside in a CE that receives power from a PDU in the topology. FIG. 3 also illustrates an example set of PDUs and CEs arranged in a power topology and a topology logic 300 for automatically discovering and describing the power topology. However, in FIG. 3, the topology logic 300 is illustrated as residing in a CE that receives power from a PDU in the topology.

FIG. 2 illustrates a single level of PDUs. A first PDU 210 is illustrated providing power to a single CE 212. PDU 210 is connected to topology logic 200 by a topology network. The topology network may, in some examples, be a data center network to which the PDUs and/or CEs are connected. While PDU 210 is illustrated being directly connected to topology logic 200, it is to be appreciated that the connection may be direct and/or indirect. A second PDU 220 is illustrated providing power to CE 222 and CE 224. Thus, it is to be appreciated that a single PDU may provide power to more than a single CE. A PDU may include a number of ports to which CEs can be connected. The ports may be used to connect a power line between devices. As described above, the power line may also be used as a data communication line when both the PDU and the CE include a network interface device configured to communicate over the power line. The association between PDU 220 and CE 222 includes a port identifier (e.g., port number) that describes a port to which CE 222 is connected. PDU 230 is illustrated providing power to a set of computers (e.g., 232 through 234). Thus, FIG. 2 illustrates that a power topology may include a set of PDUs that are connected to and provide power to a set of computers. The connections may not be permanent. Therefore, different CEs in a power topology may be connected to different PDUs at different times. Therefore topology logic 200 may perform an initial power topology discovery but may then continue to monitor the topology, and to update data describing the topology upon detecting a change to the topology.

FIG. 3 also illustrates an example set of PDUs and CEs arranged in a power topology and a topology logic 300 for automatically discovering and describing the power topology. Topology logic 300 is, illustrated residing in CE 334. While topology logic 300 is illustrated residing in a single CE, it is to be appreciated that in one example topology logic 300 may be distributed between two or more communicating and cooperating computers.

The topology of PDUs and CEs in FIG. 3 includes multiple tiers of devices. In the topology in FIG. 3, a PDU may be connected to a CE and to another PDU. In the topology in FIG. 3, a PDU may also be connected to just other PDUs. Thus, FIG. 3 illustrates that a PDU is not to be limited to just a rack-level or even room-level device. In different examples, a PDU may be a room-level device, a datacenter-level device, a building-level device, and so on.

For example, PDU 32010 may be the highest level PDU for a configuration (e.g., datacenter). PDU 32010 may be the device through which an entire building is powered. PDU 3201.0 may be connected to PDU 3100 and PDU 3102, each of which may be room-level PDUs. PDU 3100 may in turn be connected to PDU 310 and PDU 320, each of which may be rack-level PDUs. Similarly, PDU 3102 may be connected to PDU 330, which is also a rack-level PDU. Rack level PDU 310 may power a single CE 312 in its rack while rack level PDU 320 may power both CE 322 and CE 324. PDU 330 may be connected to a large number of CEs including, for example, CE 332 through CE 334. Thus, it is to be appreciated that topology logic 300 may discover and report on not just PDU/CE associations but also on PDU/PDU associations. It is to be appreciated that the term "PDU" may refer to power delivery components including, for example, an uninterruptible power supply (UPS), a static transfer switch, and other power equipment in the power-delivery path between a building input and the communicating equipment.

Figure 4:
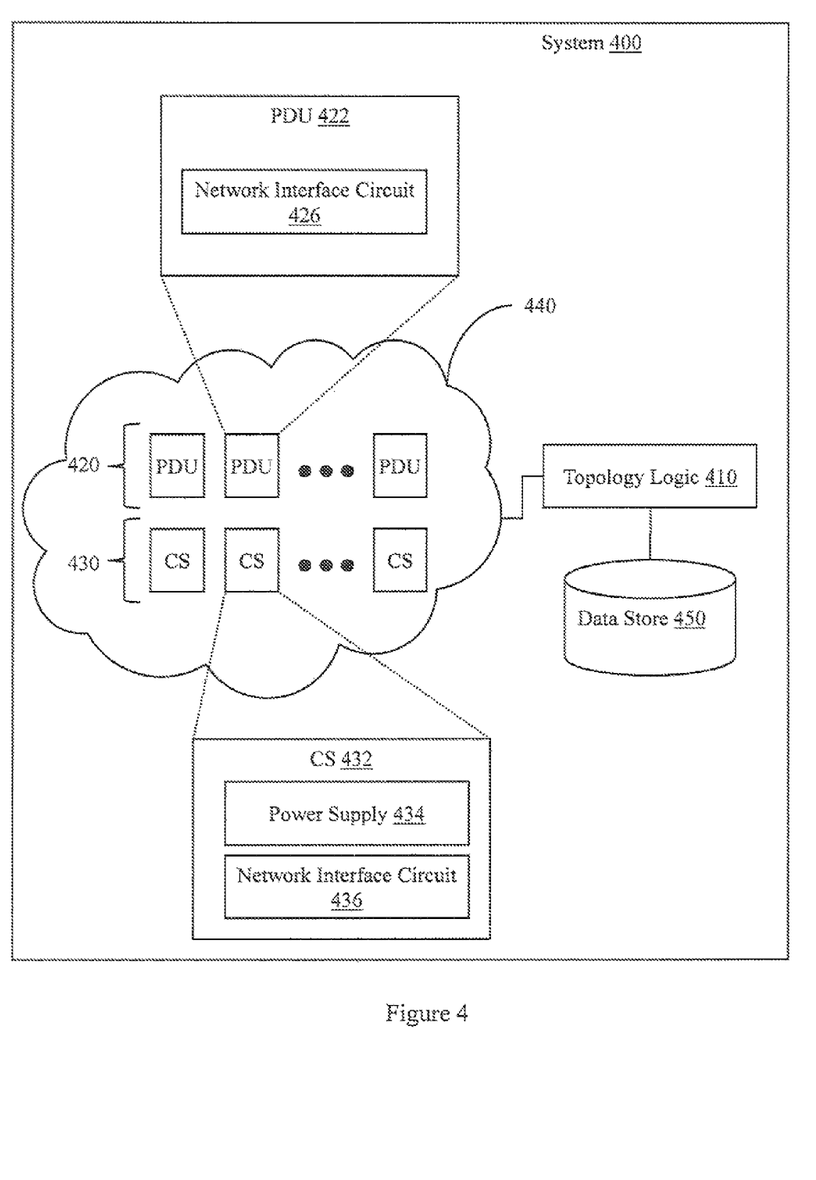
FIG. 4 illustrates another example system associated with automated power topology discovery.

FIG. 4 illustrates a system 400 that automatically discovers a power topology. The system 400 includes a topology logic 410 to automatically identify and characterize a power topology 440 in which a set 420 of power distribution units and a set 430 of computers are arranged. System 400 also includes a data store 450. Unlike system 100 (FIG. 1), system 400 also includes the set 420 of power distribution units, and the set 430 of computers.

A computer (CS) (e.g., computer 432) in system 400 has a power supply (e.g., power supply 434) and a CS network interface circuit (e.g., circuit 436). The CS network interface circuit communicates with a PDU network interface circuit (e.g., circuit 426). Since a PDU is connected to a CS by a power line through which the PDU provides power to the CS, the CS network interface circuit communicates with the PDU network interface circuit through the power line.

A PDU in system 400 has one or more ports to which a CS power supply may be connected by a power line. A PDU port may also be used to connect a PDU to another PDU. A PDU (e.g., PDU 422) in system 400 also has a PDU network interface circuit (e.g., circuit 426) to communicate with a CS and/or a PDU.

Topology logic 410 is to automatically identify a power topology in which the set 420 of PDUs and the set 430 of CSs are arranged. In one example, the power topology is described by a set of PDU/CS associations. Thus, data store 450 is to receive a set of PDU/CS associations from the topology logic 410.

System 400 also includes a topology network over which members of the set 420 of PDUs are to communicate. Recall that a member of the set 430 of CSs is to receive power from a member of the set 420 of PDUs through a power line. Recall also that a member of the set 430 of CSs is to communicate with a member of the set 420 of PDUs through a power line using a CS network interface circuit. Therefore, a PDU/CS association stored in data store 450 describes a PDU port to which a CS is connected. In one example, the set 420 of PDUs may be arranged in tiers. A first tier PDU may provide power to a CS and may receive power from a second tier PDU. A second tier PDU may provide power to a first tier PDU and may receive power from a yet higher tier PDU. In this example, data store 450 may store both PDU/CS association data and PDU/PDU association data.

In one example, a member of the set 430 of CSs is to communicate with a member of the set 420 of PDUs over a power line using an Ethernet over Power (EoP) protocol. In this example, the network interface circuit in a CS may be a MC and the network interface circuit in a PDU may be an Ethernet switch. In this example, topology logic 410 may examine Ethernet frame data to determine associations between communicating devices and may selectively store data derived from the Ethernet frame data in data store 450.

Topology 440 may not be static. Therefore topology logic 410 may automatically re-identify the power topology 440 in which the set 420 of PDUs and the set 430 of CSs are arranged upon detecting a change to the power topology 440. The change may occur when a CE is disconnected from a first port in a PDU and reconnected to another port in a PDU, when a CE is simply disconnected from a PDU, when a new PDU is added to topology 440, and so on.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to: implement an example methodology. Blocks may be combined or separated into multiple components. Furthermore, additional and/or alternative methodologies can employ additional, not illustrated blocks.

Figure 5:
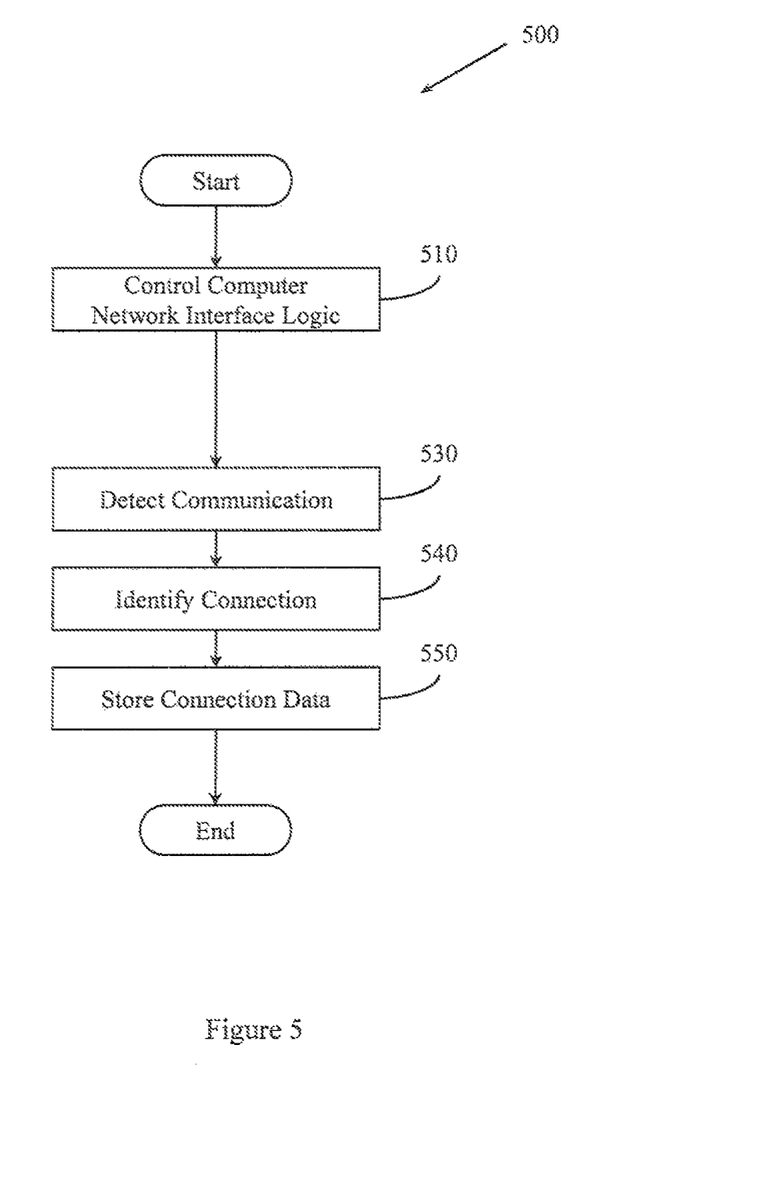
FIG. 5 illustrates an example method associated with automated power topology discovery.

FIG. 5 illustrates a method 500 associated with automated power topology discovery and characterization. Method 500 includes, at 510, controlling a network interface logic in a computer. Controlling the network interface logic at 510 may include controlling the logic to communicate with a PDU through a power line connecting the computer power supply to the PDU. In one example, the logic may communicate with a PDU through the computer power supply. Controlling 510 the network interface logic may include, for example, sending a signal to the logic, initiating a process performed by the logic, providing a computer communication to the logic, invoking a method available in an object associated with the logic, and so on.

Since a computer may communicate with a PDU through a power line, the PDU may in turn communicate with the computer through the power line. In one example, the network interface logic in the computer and the network interface logic in the PDU may be Ethernet NICs and/or switches. Therefore, controlling the network interface logic at 510 may include controlling the network interface logics to communicate using an Ethernet over Power (EoP) protocol.

Method 500 may also include, at 530, detecting a communication between the PDU and the computer. When a network to which the PDU and/or the computer involved in the communication are involved broadcasts communication data (e.g., Ethernet frames) to a computer in which method 500 is executing, detecting the communication may include examining data packets, frames, and so on. When a network to which the PDU and/or the computer involved in the communication does not broadcast communication data to a computer in which method 500 is executing, detecting the communication may include examining communication reports provided by computing devices to which the communication data was broadcast. Therefore, it is to be appreciated that detecting 530 the communication may include a direct action on communication data (e.g., frames) available to method 500 and/or may include an indirect action on data (e.g., reports) provided by another computer(s) that observed the communication.

Method 500 may also include, at 540, automatically identifying a connection between a PDU and a computer based on a detected communication. Identifying the connection may include, for example, examining source and/or destination addresses available in a network packet, frame, and so on, involved in the communication. For example, a communication between a PDU and a computer may have occurred using EoP. Therefore, a data packet that includes a PDU source address, a PDU network interface circuit identifier, a computer address, and/or a computer network interface circuit identifier may be available for inspection. The inspection may reveal the connection.

Method 500 may also include storing 550 data describing the identified connection in a data store that stores data concerning a set of identified connections that characterize a topology of connected PDUs and computers. Storing the data may include, for example, updating a list in a memory, updating a table in a database, updating a graph, updating an XML file, and so on. In one example, storing 550 data describing the identified connection includes storing a PDU identifier, a PDU port identifier, and a computer identifier. The PDU port identifier is to identify a port in a PDU identified by the PDU identifier to which a computer identified by the computer identifier is connected.

While FIG. 5 illustrates various actions occurring in serial, it is to be appreciated that various actions illustrated in FIG. 5 could occur substantially in parallel. By way of illustration, a first process could control a computer network interface logic, and a second process could detect communications, identify connections based on the communications, and store connection data that characterizes the topology by identifying its connections. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 500. While executable instructions associated with the method 500 are described as being stored on a computer-readable medium, it is to be appreciated that executable instructions associated with other example methods described herein may also be stored on a computer-readable medium.

Figure 6:
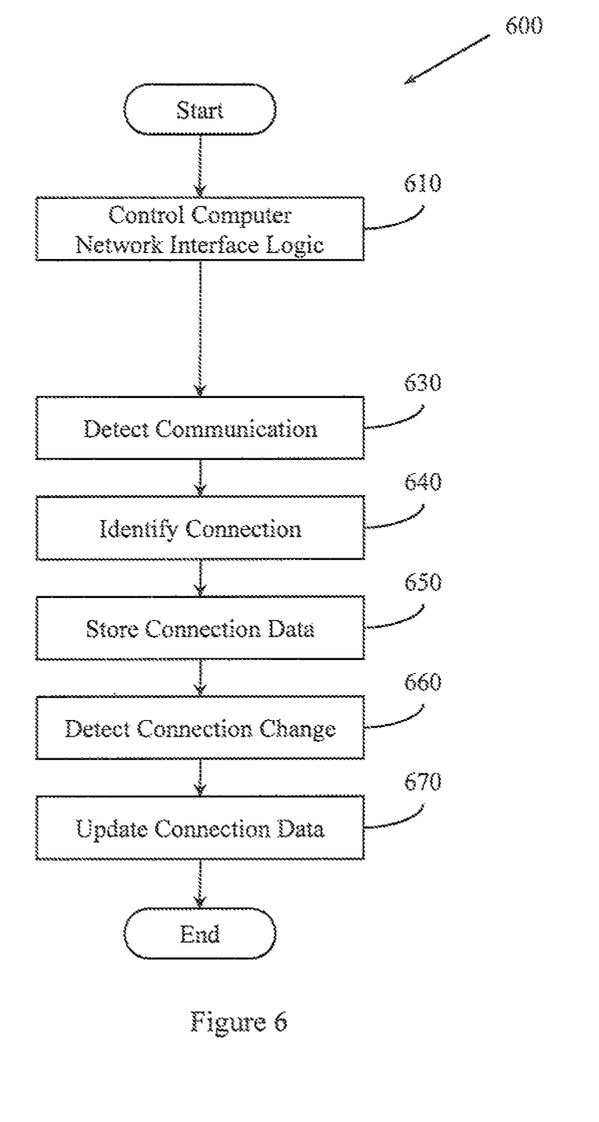
FIG. 6 illustrates another example method associated with automated power topology discovery.

FIG. 6 illustrates a method 600 for automated power topology discovery and characterization. Method 600 includes some actions similar to those described in method 500. (FIG. 5). For example, method 600 includes controlling a network interface logic in a computer at 610, detecting a communication at 630, identifying a connection at 640 based on the detected communication, and storing connection data at 650. However, method 600 includes additional actions.

For example, method 600 may include detecting 660 a change to a connection between a PDU and a computer. The change may occur when a computer is connected to a PDU, when a computer is disconnected from a PDU, when a PDU is added to a topology, when a PDU is removed from a topology, and so on. As PDUs and/or computers are added and/or removed, communications between devices will change. These communications can be detected and inspected to reveal new connections and to discover the absence of old connections. In method 600, controlling the network interface logic at 610 may include controlling the logic to send a test message to another device (e.g., PDU) for which a connection was previously stored. The test message will generate traffic that can be detected and identified. If the test succeeds, no change to connection data may occur. However, if the test fails, a change may be determined and connection data may be updated.

Having detected a connection change, method 600 may include selectively updating 670 the data concerning the set of identified connections based, at least in part, on the detected change.

Figure 7:
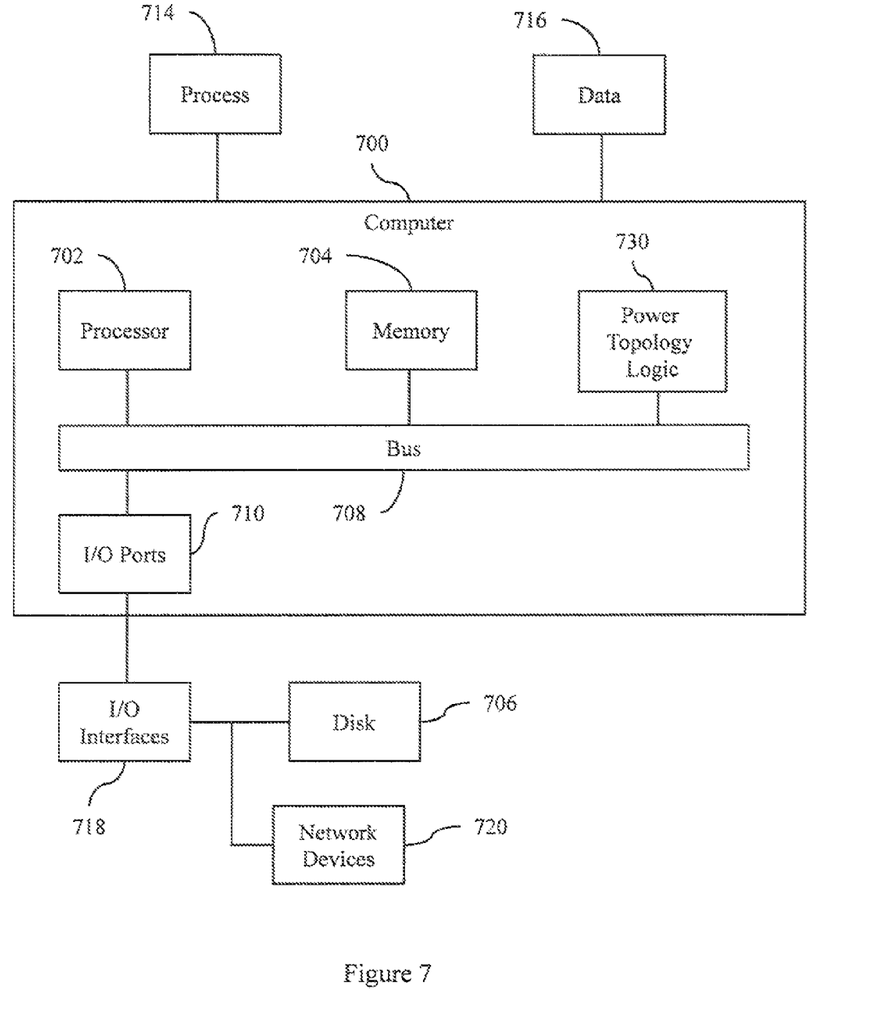
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a power topology logic 730 configured to facilitate automatically discovering and storing information describing a topology in which a set of PDUs and a set of computers are arranged, where the set of computers receives power from the set of PDUs. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Logic 730 may provide means (e.g., hardware, software, firmware) for communicating a computer communication over a power line that connects a PDU and a CE. The means may be, for example, an Ethernet NIC configured to run an EoP protocol. Logic 730 may also provide means (e.g., hardware, software, firmware) for detecting a computer communication occurring over the power line. The means may be, for example, a line monitor or sniffing circuit. Logic 730 may also include means (e.g., hardware, software, firmware) for determining a topology of connected PDUs and computers based on communications detected between connected PDUs and computers. Having determined the topology, logic 730 may store data that characterizes the topology in, for example, memory 704 and/or on disk 706. This data may in turn be used by applications including, for example, a power capping application.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   a topology logic to automatically identify and describe a power topology in which a set of power distribution units (PDUs) and a set of computers (CEs) are arranged, where the topology logic is to describe the power topology using a set of PDU to CE (PDU/CE) associations, where each PDU/CE association includes a PDU identifier, a PDU port identifier, and a CE identifier, where the PDU port identifier identifies a port in a particular PDU identified by the PDU identifier to which a particular CE identified by the CE identifier is directly connected, where each CE is directly connected only to one PDU port; and
   a data store to receive data from the topology logic, where the data received from the topology logic is associated with the set of PDU/CE associations;
   where a CE includes a power supply and a CE communication circuit to communicate with a PDU communication circuit associated with a first PDU from which the CE receives power, where the CE communication circuit communicates with the PDU communication circuit through a power line through which the CE receives power, where the first PDU includes the PDU communication circuit to communicate with the CE communication circuit.

2. The system of claim 1, where the power topology includes two or more tiers of PDUs arranged in a hierarchy, and where the power topology is described by the set of PDU/CE associations and a set of PDU/PDU associations.

3. The system of claim 1, where a PDU/CE association includes an identification of a PDU port to which the CE is connected.

4. The system of claim 2, where a PDU/PDU association includes an identification of a second PDU port to which a second PDU is connected.

5. The system of claim 1, where the first PDU includes a PDU network interface device to report the existence of a PDU/CE association to the topology logic over the topology network.

6. The system of claim 5, where reporting the existence of PDU/CE association includes providing a PDU port to which the CE associated with the PDU/CE association is connected.

7. The system of claim 1, where the PDU communication circuit is an Ethernet NIC, where the CE communication circuit is an Ethernet NIC and where the PDU and the CE communicate using an Ethernet over Power (EoP) protocol on the power line through which the first PDU provides power to the CE.

8. The system of claim 1, where the PDU communication circuit is configured to facilitate management software relocating the identity of a server connected to the first PDU without requiring reconfiguration of network partitions.

9. The system of claim 1, where the topology logic resides in a multi-purpose CE.

10. The system of claim 1, where the topology logic resides in a dedicated CE.

11. The system of claim 1, where the set of PDUs includes a room-level device.

12. The system of claim 11, where the set of PDUs includes a data-center level device.

13. The system of claim 1, where the topology logic is to automatically re-discover and re-characterize the power topology after a change in a PDU/CE association.

14. A system, comprising:
   a computing system (CS), comprising:
      a CS power supply; and
      a CS network interface circuit to communicate with a power distribution unit (PDU) network interface circuit, where the CS network interface circuit communicates with the PDU network interface circuit through a power line through which the power supply receives power from a first PDU;
   the first PDU, comprising:
      a plurality of ports, where the CS power supply is connected to the first PDU through a first port of the plurality of ports, and where a second PDU is connected to the first PDU through a second port of the plurality of ports; and
      a PDU network interface circuit;
   a topology logic to automatically identify and describe a power topology in which a set of PDUs and a set of CSs are arranged, where the topology logic is to describe the power topology using a set of PDU to CS (PDU/CS) associations, where each PDU/CS association includes a PDU identifier, a PDU port identifier, and a CS identifier, where the PDU port identifier identifies a port in a particular PDU identified by the PDU identifier to which a particular CS identified by the CS identifier is directly connected, where each CS is directly connected only to one PDU port;
   a data store to receive the set of PDU/CS associations from the topology logic; and
   a topology network to communicate information about the power topology.

15. The system of claim 14, where the set of PDU/CS associations comprises a set of attribute/value pairs defined in Extensible Markup Language (XML).

16. The system of claim 14, where the set of PDUs is arranged in tiers, where a first tier PDU provides power to the particular CS and receives power from a second tier PDU.

17. The system of claim 16, where a member of the set of CSs is to communicate with a member of the set of PDUs over the power line using an Ethernet over Power (EoP) protocol, where the CS network interface circuit is an Ethernet NIC, and where the PDU network interface circuit is an Ethernet switch.

18. The system of claim 17, where the topology logic is to automatically re-identify the power topology in which the set of PDUs and the set of CSs are arranged upon detecting a change to the power topology.

19. A non-transitory computer-readable medium storing computer-executable instructions that, when executed by a processor, cause the processor to perform a method, the method comprising:
   detecting, using the processor, a communication between a power distribution unit (PDU) and a computer through a power line;
   automatically identifying, using the processor, a connection between the PDU and the computer based on the detected communication; and
   based on the identified connection, storing, in a particular entry of a data structure, a PDU identifier, a PDU port identifier, and a computer identifier, where the PDU port identifier identifies a port in a particular PDU identified by the PDU identifier to which a particular computer identified by the computer identifier is connected, where the data structure is stored in a data store, where the data structure is to describe a topology of connected PDUs and computers, where each computer is directly connected only to one PDU port.

20. The non-transitory computer-readable medium of claim 19, where the data structure comprises a set of attribute/value pairs defined in Extensible Markup Language (XML).

21. The non-transitory computer-readable medium of claim 19, the method further comprising controlling the network interface logic in the computer to communicate with the PDU through the power line.

22. The non-transitory computer-readable medium of claim 19, including:
   detecting a change to the connection between the PDU and the computer; and
   selectively updating the data concerning the set of identified connections based, at least in part, on the detected change.

23. The non-transitory computer-readable medium of claim 21, where controlling the network interface logic in a computer to communicate with a PDU through a power line connecting the computer power supply to the PDU includes controlling the network interface logic to send a test message to a destination based, at least in part, on connection data in the set of identified connections.

24. A method, comprising:
   communicating a computer communication over a power line that connects a power distribution unit (PDU) and a computer (CE);
   detecting a computer communication occurring over the power line; and
   based on the detected computer communication, storing a PDU identifier, a PDU port identifier, and a CE identifier in a particular entry of a data structure, where the CE identifier identifies the CE, the PDU identifier identifies the PDU, and the CE is directly connected only to a PDU port identified by the PDU port identifier, where the data structure is stored in a data store, where the data structure is to describe a power topology of connected PDUs and computers.

* * * * *

UNITED STATES PATENT AND TRADEMARK OFFICE
CERTIFICATE OF CORRECTION

| | | |
|---|---|---|
| PATENT NO. | : 8,726,045 B2 | Page 1 of 1 |
| APPLICATION NO. | : 12/935125 | |
| DATED | : May 13, 2014 | |
| INVENTOR(S) | : Alan L. Goodrum et al. | |

It is certified that error appears in the above-identified patent and that said Letters Patent is hereby corrected as shown below:

In the Specification

In column 1, line 11, delete "PCT/US52008/004237," and insert -- PCT/US2008/04237, --, therefor.

Signed and Sealed this
Ninth Day of September, 2014

Michelle K. Lee
*Deputy Director of the United States Patent and Trademark Office*